United States Patent Office 3,520,512
Patented July 14, 1970

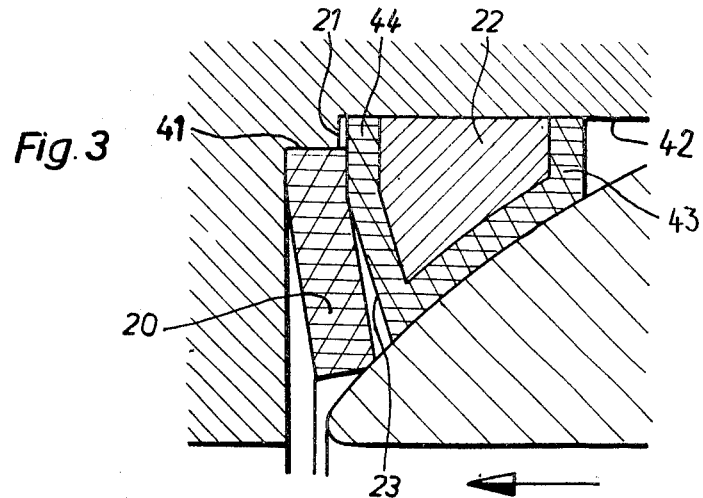
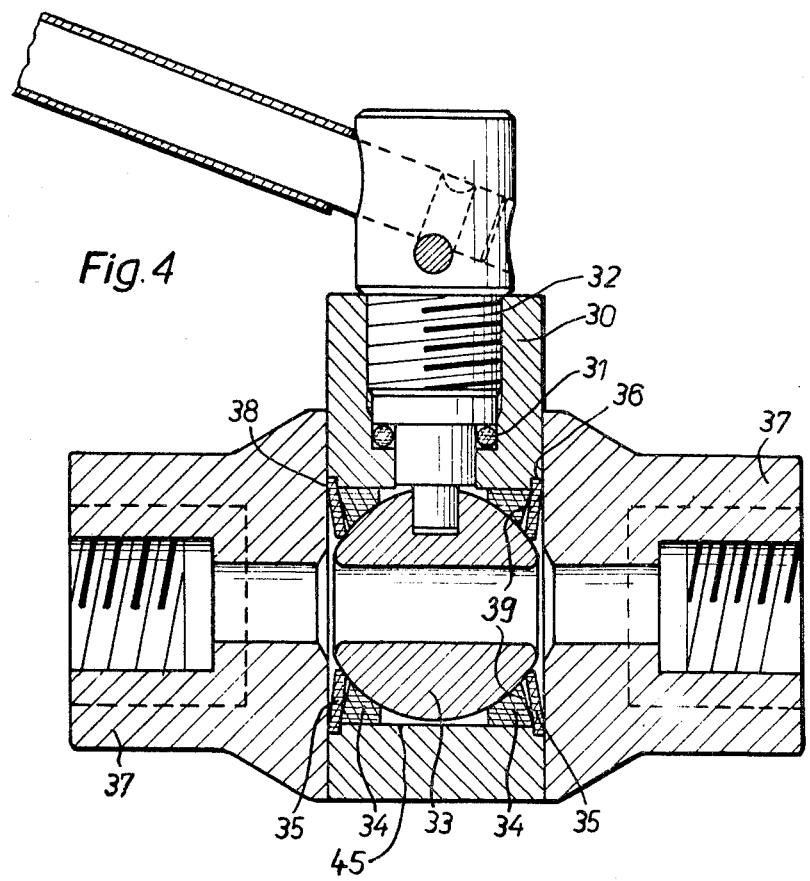

---

3,520,512
SPHERICAL PLUG COCKS
Richard Huber, Modling, Vienna, Austria, assignor to Istag A.G. Suhr/AG, Suhr, Aargau, Switzerland
Filed Sept. 5, 1967, Ser. No. 665,454
Claims priority, application Austria, Sept. 5, 1966, A 8,386/66
Int. Cl. F16k 5/06
U.S. Cl. 251—172           15 Claims

ABSTRACT OF THE DISCLOSURE

The ball plug of the cock according to the invention is mounted between two pairs of rings engaged in the cock casing and surrounding the inlet and outlet passages on the upstream side and on the downstream side of the ball. Each pair of rings comprises a seat ring for the ball and a resiliently yielding sealing ring arranged adjacent that side of the seat ring which is facing away from the ball; the outer rim of the sealing ring is in sealing engagement with the casing and the inner rim thereof bears with an initial tension against the ball. Preferably, the outer rim portion of the sealing ring is of cylindrical shape, while the inner rim portion is conical with the conicity directed towards the ball plug.

---

Figure 1:
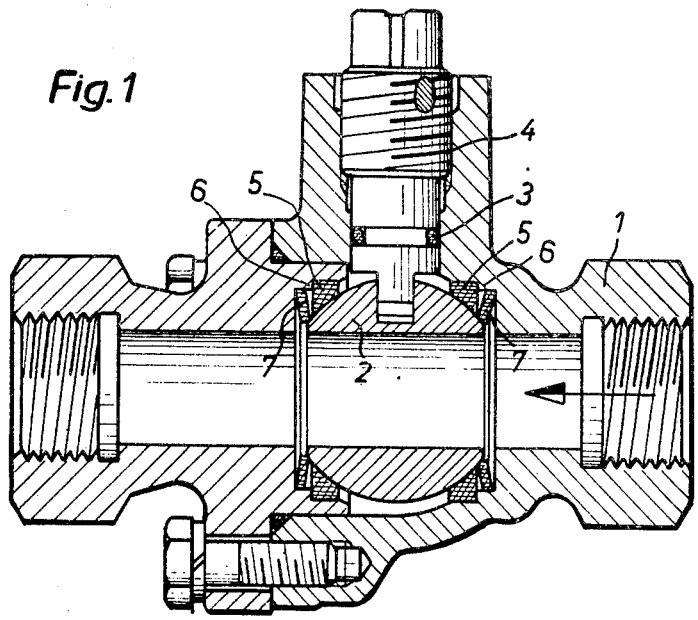

The invention relates to a stop cock having a spherical plug which is rotatably mounted between rings arranged about the inlet and outlet passage in the cock casing.

In such known stop cocks, the sealing is effected in that the ball is pressed by the action of the fluid medium against the ring situated on the low pressure or downstream side and thus effects a sealing. Recently, the requirement has been made that in such spherical plug cocks an additional sealing should be obtained by the sealing element on the high pressure side. The known constructions which correspond to this requirement comprise rings of plastic or the like in the cock casing, which bear by a flexible portion, e.g. a lip, with initial tension against the ball, so that on the high pressure side the admission pressure still further presses the flexible portion into contact with the ball and effects a sealing. A major portion of each ring then serves for seating the ball, the ring on the low pressure side, i.e. the downstream ring serving for this task and at the same time effecting the sealing at this location. Since the ball, when subjected to pressure, is forced into the ring on the low pressure side until the resistance thereof against deformation is high enough, the flexible portion of the ring on the high pressure side must yield to such a degree that it follows the resulting movement of the ball and maintains the fluid seal on the high pressure side. The material of the rings accordingly must have the necessary yielding propetry and, at the same time, it should be unable to deform in order to effect a seating of the ball on the low pressure side without a too large deflecting movement of the ball. Since such rings shall seal at different pressures, these diverge requirements often cannot be fulfilled. besides, the known single piece sealing elements are of a relatively complicated shape, and the flexible parts are highly stressed, because they are subjected to considerable deformation as compared with their relatively small dimension.

It is an object of the invention to provide an improved stop cock which will avoid the difficiencies of the above mentioned cocks which effect a sealing on the high pressure side. The invention starts from the idea to subdivide the rings surrounding the inlet and the outlet passage of the cock into two separate rings and to assign to each of the two rings one of the two functions which the known single piece rings have to fulfill.

According to the invention, a pair of adjacent rings is provided on the upstream side and on the downstream side of the ball, each pair of rings comprising a seat ring for the ball and a separate plate spring-shaped sealing ring, the sealing ring being arranged on the side of the seat ring facing away from the ball and having its outer rim in sealing engagement with the casing, while its inner rim bears against the ball by an initial stress directed towards the ball. During operation of this a cock, the sealing ring on the high pressure side and the seat ring on the low pressure side are operative. These rings can be formed to correspond to their duties, i.e. the sealing ring can be given the correct dimension and can be made of the correct material for obtaining an efficient sealing at high flexibility, while the seat ring can be formed to be as much as possible unyielding. In operation, the ball practically is not subjected to axial movements, even at greatly different pressures, whereby the sealing rings are little stressed. The cocks according to the invention still offer an additional security, because also after damaging the interior edge of the sealing ring, this latter still bears against the seat ring and thus in cooperation with the same effects a certain, though mostly incomplete seal. Preferably, the peripheral surface of the outer rim of the sealing ring is cylindrical in unstressed condition and engaged in a cylindrical bore of the casing. In pretensioned condition, i.e. upon compression of the conical shape, the outer wall bears under tension against the cylindrical bore of the casing and thus effects a quite substantial seal. When the sealing ring includes a thickening towards the outer rim, an additional bending stress can be imparted to the sealing ring on the low pressure side towards the region of the inner rim.

The plate spring-shaped sealing ring may consist of different materials, e.g. metal, and plastic etc. according to the case, it can be completely flat in pretensioned, normal condition, or it can have a conicity. However, it is important that the modification of the conicity does not exceed a value depending on the material used. Advantageously the sealing ring consists of PTFE, and the modification of the conicity of the plate shape between the unstressed and pretensioned condition is 2–15°, preferably 5–10°.

For higher stresses, it is advantageous that the seat ring is axially movable in the casing, since it can then be formed as a sealing ring support which will follow the movements of the sealing ring. The seal on the low pressure side between the casing and the seat ring is then effected by the sealing ring clamped therebetween. For particularly high stresses, it is advantageous when the mobility of the seat ring is limited by an abutment admitting only a predetermined compression of the sealing ring. It is thereby possible to avoid an overstressing of the sealing ring on the low pressure side, which prevents damage of this ring and excludes axial movements of the ball. The abutments can be provided either on the casing wall or on the seat ring. When the face of the movable seat ring directed away from the ball extends at right angles to the axis of the cock, the sealing element on the low pressure side is pressed flat, so that the previously mentioned additional bending is required in order to avoid a plastic deformation of the sealing element. However, it is also possible to form the seat ring in such manner that the face directed away from the ball presents a conicity in the direction towards the ball, whereby also the sealing ring on the low pressure side has sufficient clearance without requiring an additional bending. According to the required stresses, the seat ring can be formed to be resistant against deformation, e.g. also of metal having good antifriction properties.

Figure 2:
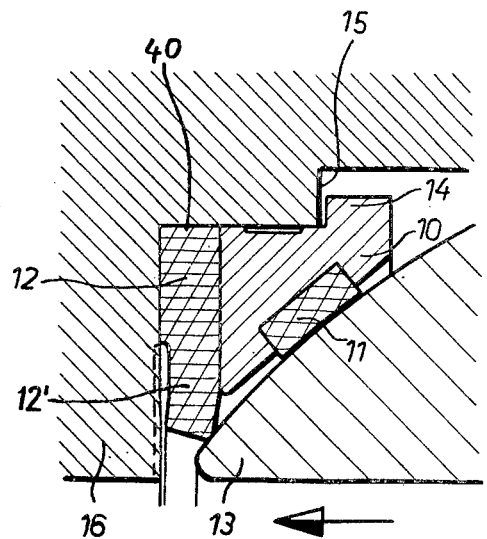

The invention will now be explained in detail by reference to the examples illustrated in the accompanying drawings; wherein FIG. 1 shows a spherical plug cock according to the invention in axial section;

FIGS. 2 and 3 respectively illustrate seat and sealing rings on the low pressure side of modified spherical plug cocks according to the invention; and FIG. 4 shows a cock according to the invention having three casing parts.

The spherical plug cock represented in FIG. 1 comprises a two-part casing 1 which encloses a ball 2. This ball is operable by an actuating stem 4 which is sealed towards the outside by means of O-rings. The ball 2 is guided in the casing by seat rings 5 which are maintained against outward movement by shoulders 6 provided in the casing. Adjacent the face of the seat rings turned away from the ball, plate spring-shaped sealing rings 7 of PTFE (polytetrafluorethylene) are inserted into the casing. The sealing rings are pretensioned when the cock is assembled, i.e. due to being compressed by the ball, they are flattened with respect to their unstressed conical shape directed towards the ball. Thus, the rings 7 are applied by the outer periphery with pressure against the casing and at the same time by their interior edge against the ball; this pressure increases correspondingly on the high pressure side, i.e. on the upstream sealing ring upon admission of pressure and thus effects the seal for the increased pressure. The spherical plug cock according to the invention is represented as having the pressure admission on the right hand side; on the low pressure side the downstream seat ring 5 effects a seal by bearing against the shoulder 6. The seat rings, in such a construction, preferably consists of a reinforced plastic, for example of a filled PTFE, so that the movement of the ball due to deformation remains as small as possible. The sealing ring 7 on the low pressure side is slightly more biased than the sealing ring on the high pressure side, but is not pressed to be completely flat.

FIG. 2 is a fragmentary view of a modified spherical plug cock according to the invention and shows a downstream sealing ring and associated seat ring of a cock construction for higher operating pressures, the pressure fluid admission being again effected from the right side. The seat ring 10 consists of an annular metal body which is provided with a ring of plastic 11 inserted into the contact surface with the ball, particularly of PTFE, which arrangement results in the smallest frictional resistance. The seal on the low pressure side is obtained on the one hand by the sealing ring 12, which has its inner edge outwardly bent with respect to the ball. The seat ring 10 bears against the sealing ring 12, so that also at this place a seal is obtained. The seat ring which is guided in the same bore 40 in which the sealing ring is also inserted, is provided with a shoulder 14 at its end directed towards the ball 13, which shoulder cooperates with a recess 15 on the casing 16. This shoulder prevents the seat ring from moving too far in the direction towards the sealing ring, whereby excess pressure on the sealing ring and damage thereof is avoided. The sealing ring is provided with a thickened portion 12 towards its outer rim, so that the inner rim portion 12′ is freely movable. If the sealing ring were of constant thickness, this mobility could also be obtained by recessing the wall of the bore in the casing to the shape indicated by dotted lines.

FIG. 3 shows the downstream sealing and seat rings of a spherical plug cock according to the invention, in which the sealing ring also is not pressed flat. The thickness of the sealing ring 20 is so dimensioned that the outer rim of the ring slightly projects beyond the shoulder 21 provided between the two bores 41 and 42 for the sealing ring and the seat ring. The seat ring 22 which in this case consists of a metal ring coated with plastic 43, is supported, with the represented pressure admission from the right side, by its flat outer rim on the sealing ring 20, whereby the seal on the low pressure side is effected. The major portion of the end face 23 of the seat ring 22 facing the sealing ring is provided with a conicity directed towards the ball and thus enables a free play of the sealing ring also on the low pressure side. In the examples according to FIGS. 2 and 3, the sealing is effected on the high pressure side in the same manner as in the example described with reference to FIG. 1.

In the spherical plug cock represented in FIG. 4, the sealing and seat rings are inserted in the middle part 30 of the casing in which also is mounted the actuating stem 32 for the ball 33, which stem is sealed by O-rings 31. In this construction, the seat rings 34 are inserted in the through bore 45 provided for the ball in the middle part 30 of the casing, while the sealing rings 35 seal against a greater diameter. The recess 36 of greater diameter is so dimensioned that when assembling the two casing ends 37 (which are drawn together by tensioning screws, not shown) at the same time a sealing of the casing joints between the middle part and the end parts thereof is obtained by the sealing rings 35. The seat rings 34 which consist of filled plastic or graphite, are practically immovable as a result of being clamped between the ball and the plane end faces 38 of the sealing rings. The end faces 39 of the seat rings 34 present a conicity which is directed towards the ball; the sealing rings consist of PTFE and a space of wedge-shaped cross section is formed between the opposite end faces of the seat rings and the sealing rings, so that the sealing rings can always freely move and seal in the manner as described above with reference to the other examples.

What is claimed is:

1. A spherical plug cock of the kind in which a ball plug is rotatably mounted between rings arranged about the inlet and outlet passages in the cock casing, wherein the improvement comprises a pair of adjacent rings respectively provided on the upstream side and on the downstream side of the ball, each pair of rings including a seat ring having an inner periphery engaging the ball and serving as a bearing and seal therefor, and a separate plate spring-shaped sealing ring, the sealing ring being arranged on the side of the seat ring facing away from the ball and having an outer rim in sealing engagement with the casing, at least the inner portion of said plate spring-shaped sealing ring being conical in unstressed condition, said conical portion of said sealing ring having an inner edge spaced from the associated seat ring and independently engaging the spherical wall of the plug without contact with the associated seat ring, the inner edge of said conical portion engaging the spherical wall of the plug under initial tension, whereby the conicity of said conical portion of the sealing ring in stressed condition is modified with respect to the conicity in unstressed condition.

2. A spherical plug cock according to claim 1, in which the outer rim of the sealing ring has a peripheral surface which is cylindrical in unstressed condition and is engaged in a cylindrical bore of the casing.

3. A spherical plug cock according to claim 1, in which the sealing ring comprises an annular thickened portion forming the outer rim portion of the ring.

4. A spherical plug cock according to claim 1, in which the sealing ring consists of PTFE, the modification of the conicity of the plate spring-shape between the unstressed and the initially stressed condition amounting to 2–15°.

5. A spherical plug cock according to claim 1, in which the sealing ring consists of PTFE, the modification of the conicity of the sealing ring between the unstressed and the initially stressed condition amounting to 5–10°.

6. A spherical plug cock according to claim 1, in which the seat ring is arranged to be axially movable in the casing.

7. A spherical plug cock according to claim 6, in which the axial mobility of the seat ring is limited by an abutment admitting only a predetermined compression of the sealing ring.

8. A spherical plug cock according to claim 7, in which said abutment is formed between a bore for the sealing ring and a bore of greater diameter for the seat ring.

9. A spherical plug cock according to claim 7, wherein said seat and sealing rings have the same outside diameter and are inserted in a common bore of the casing, the end faces of the seat rings directed towards each other being provided with said abutment cooperating with a shoulder of the casing for limiting the axial mobility of the seat rings.

10. A spherical plug cock according to claim 7, in which the end face of the seat ring directed away from the ball extends at right angles to the axis of the cock.

11. A spherical plug cock according to claim 1, in which the end face of the seat ring facing away from the ball is conical and tapers in the direction towards the ball.

12. A spherical plug cock according to claim 1, in which the seat ring consists of filled plastic.

13. A spherical plug cock according to claim 1, in which the seat ring consists of metal coated with plastic.

14. A spherical plug cock according to claim 1, in which the seat ring comprises an annular body having a ring of plastic material inserted into the contact surface with the ball.

15. A spherical plug cock according to claim 12, in which said seat ring consists of PTFE.

References Cited

UNITED STATES PATENTS

| | | | |
|---|---|---|---|
| 2,861,773 | 11/1958 | Clade | 251—174 X |
| 2,942,840 | 6//1960 | Clade | 251—174 |
| 3,281,112 | 10/1966 | Walker | 251—315 X |
| 3,082,992 | 3/1963 | Vickery | 251—172 |
| 3,346,233 | 10/1967 | Billson | 251—315 X |

FOREIGN PATENTS

| | | |
|---|---|---|
| 977,442 | 12/1964 | Great Britain. |
| 1,207,168 | 12/1965 | Germany. |

M. CARY NELSON, Primary Examiner

M. O. STURM, Assistant Examiner

U.S. Cl. X.R.

251—315